July 21, 1964 R. F. RICHTER 3,141,352
SELF-REGULATING TENSION MEANS
Filed May 22, 1961
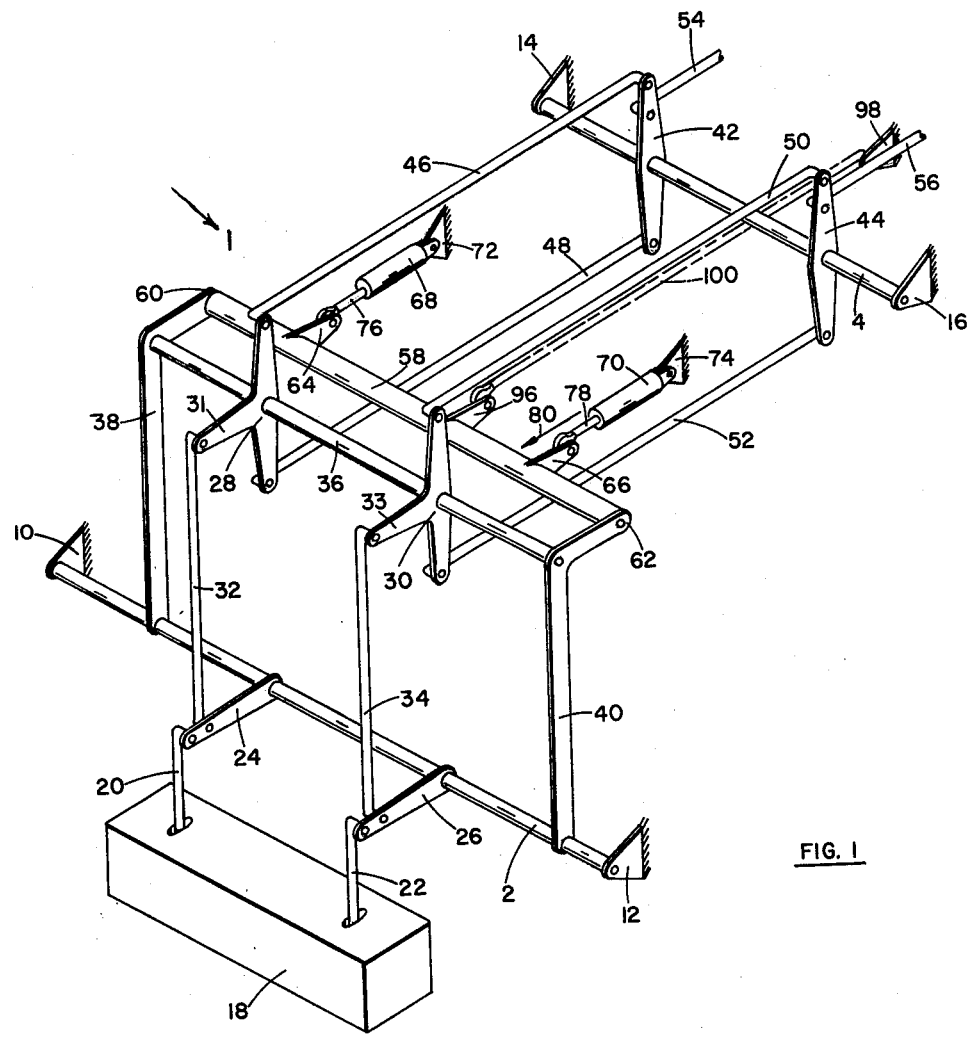
FIG. 1
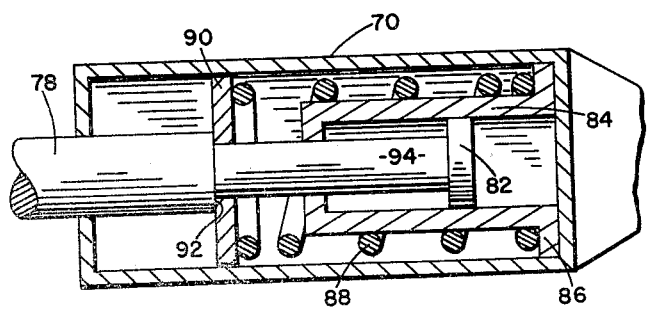
FIG. 2
*INVENTOR.*
ROBERT F. RICHTER
ATTORNEY United States Patent Office 3,141,352
Patented July 21, 1964

3,141,352
SELF-REGULATING TENSION MEANS
Robert F. Richter, Los Angeles, Calif., assignor to North American Aviation, Inc.
Filed May 22, 1961, Ser. No. 126,744
13 Claims. (Cl. 74—501.5)

This invention relates to mechanical systems for transmitting force from one location to another such as required in vehicle control systems for moving a control member in response to an input force. More particularly, this invention concerns provisions for maintaining the performance characteristics in such a system substantially unchanged during uncontrolled deflections of vehicle structure such as result from external forces on the vehicle or from variations in temperature, and which affect the total distance between the locations where input force is applied to the system and where the output force occurs.

The teachings disclosed herein may be applied to many different mechanical systems for transmitting force over any distance for any purpose, especially cable systems used in controlling vehicles of various types. However, a particular need for this invention exists in connection with control systems for use in advanced supersonic aerial vehicles and missiles. Accordingly, the invention will be described for the sake of illustration as applied to vehicles of the stated class. It will be understood that the scope of the inventive concept is in no sense limited by any of the specific details used to explain the invention, except as determined by reference to the appended claims.

In conventional aircraft, control surfaces such as ailerons, elevators, rudders and the like are pivotally mounted on hinges permitting rotational movement thereof in either of two directions, and movement of each control surface is normally effected by means of cables strung in pairs so that each cable causes movement of the surface in one of the stated directions in response to the manipulation of a control element operated by the pilot. Such cables are connected to the operative members at either end thereof with sufficient tautness to insure that input motions of the control apparatus at one end will be immediately reflected in corresponding and simultaneous movement of the control surface or other work member at the opposite cable end. When no external forces are being applied to the cable system, the amount of tautness or pretension load in the cables is termed the rig load. Means are generally included in such cable systems for maintaining the rig load substantially constant in such cables regardless of changes in the physical dimensions of the supporting structure or of other factors affecting cable tension such as variations in environmental temperature, cable or pulley wear, etc. One type of compensating device commonly used to maintain a desired amount of rig load in control system cables is the resilient type compensator which functions as a link having variable length. In a typical installation, a link of the stated type is connected at either end to a cable, the tension of which is desired to be maintained constant. In operation, the compensating link shortens its length due to force applied by a spring located within the link, whenever the cable slackens, thus tightening the cable. Conversely, the link may extend to decrease cable tension whenever the desired rig load is exceeded.

When an input force which is herein termed the work load is applied to a pair of cables in order to rotate the control surface connected thereto, the tension in one such cable is increased to cause movement of the stated surface in the desired direction, while the tension in the other cable is decreased a corresponding amount. Thus, tension compensating links of the type described above are normally provided with a lock which prevents the link from compensating for changes in cable tension when such changes result from forces intentionally applied to the cable by the normal control elements. Such locks prevent operation of the compensating link during application of work loads, so that normal control forces will be transmitted directly to the work member without being affected or modified by the tension compensator. Operation of such locks is accomplished by a variety of means including those which function on the principle of lost motion, so that a portion of the normal control force initially applied is used to operate the lock. Operation of such locks may also involve considerable friction. Moreover, if the lock and the compensating link move whenever any movement in the cable to which they are connected occurs, the weight and inertia affects of such devices add to the forces which oppose the normal control input forces applied to the system. An additional undesirable feature of many conventional devices of the type referred to above is that failure of the resilient element in such devices may cause the controls to move uncontrollably in one direction to the maximum limit of such movement (such as full left rudder or full up aileron, for example).

Vehicles of the advanced supersonic type are characterized by great sensitivity to any variation in the forces applied thereto during their operation, requiring maximum efficiency in the arrangement of controls used for space travel at extremely high speed. Thus, the entire balance of forces around the vehicle center of gravity is extremely sensitive to slight directional variations of the control surfaces during supersonic conditions. Therefore, it is a basic requirement in vehicles of the stated type that the system by means of which movement of control surfaces is accomplished be immediately responsive to any variations of input force no matter how small. The system should also be stable so that even minor deflections of the fuselage structure should have no affect whatsoever on the amount of tension initially preset in the cables forming the control system. The system also should operate smoothly and without a trace of sluggishness throughout a wide range of temperatures from below freezing to above 600° F. Cable systems known to the prior art cannot fulfill such requirements in vehicles of the stated class.

Accordingly, it is a principal object of this invention to provide a cable control system incorporating improved means for maintaining a preset amount of tension therein substantially constant.

It is a further object of this invention to provide means as set forth in these objects which apply compensating force to maintain a predetermined amount of tension in a control system independently of control forces applied in the same system.

It is another object in the instant case to provide means as set forth herein whereby no added inertia is applied in the control system by the tension regulating means.

It is another object in the instant case to provide means as set forth in these objects wherein failure of a tension compensating device will not result in displacement of the control member toward either limit of movement.

It is a further object in the instant case to provide means as set forth in these objects which function continuously, automatically, and without the use of lost motion in the control system incorporating the same.

Other objects and advantages will become apparent upon a close reading of the following detailed description of an illustrative embodiment of the inventive concept, reference being had to the accompanying drawings wherein:

FIGURE 1 shows a general perspective view of an illustrative embodiment of the inventive concept, and
FIGURE 2 shows a cross-sectional view taken through a resilient device such as may be used to apply rig loads in the system shown by FIGURE 1.

Referring to FIGURE 1, it may be seen that the inventive concept disclosed herein includes a force transmitting system generally designated by reference numeral 1. System 1 includes two main bearing members 2 and 4 mounted by suitable means such as a plurality of brackets as shown at 10, 12, 14 and 16 affixed to relatively stationary members such as fuselage structure in the case of an aerial vehicle. Main bearing member 2 is situated near the cabin, cockpit or other origin of input control force, while main bearing member 4 may be located near the control surface or other work member to which the output force from system 1 is applied. Thus, the distance between items 2 and 4 appears minor as drawn in FIGURE 1 for the sake of convenience, but in an actual installation could be much greater than that shown, possibly exceeding 100 feet, although the inventive principles disclosed herein are applicable to installations involving much shorter distances as well. Moreover, it will be understood from the description set forth below that the inventive principles disclosed herein are applicable to installations wherein shaft 2 and structure supported thereon are mounted near the work member instead of near the cockpit, and shaft 4 is mounted near the cockpit.

It is fundamentally the purpose of system 1 to transmit an input work force applied at one end thereof across a distance to a relatively remote location where a corresponding output work force may be withdrawn from the system and applied to a working member. In the general schematic showing of FIGURE 1, reference numeral 18 denotes an element which may comprise a pilot's control stick, a servomotor, or any other device for initiating a force which is applied to system 1 through elements 20 and 22 connected to arms 24 and 26, respectively, supported on main bearing member 2. Arms 24 and 26 constitute moment arms which may be embodied in levers as shown or by equivalent devices such as arcuate segments or the like. Movement of elements 20 and 22 causes rotation of arms 24 and 26 about a center or relatively stationary first axis coinciding with the longitudinal axis of main bearing member 2. Thus, pivoting movement of arms 24 and 26 is permitted by journalling the same on member 2 whereby each arm 24 or 26 is independently movable with respect to the other arm.

Pivoting movement of arms 24 and 26 in response to input forces originating at 18 is in turn transmitted to a pair of rockable members in the form of bellcranks 28 and 30 having arms 31 and 33, respectively, to which arms 24 and 26 are connected by rigid links 32 and 34, respectively.

Bellcranks 28 and 30 are mounted for independent rotation on a common shaft 36 extending between two inverted L-shaped members 38 and 40, the lower extremities of which are mounted on main bearing member 2 for rotation about a center coinciding with the longitudinal axis of member 2. Members 38 and 40 constitute rigid support means rotatable about the axis of member 2 independently from rotation of arms 24 and 26.

Rotation of bellcranks 28 and 30 in response to the application of input forces originating at 18 is transmitted to another pair of rockable members in the form of cranks 42 and 44 to which bellcranks 28 and 30 are connected, respectively, by pretensioned force transmitting means or tension members 46, 48, 50, and 52 as shown by FIGURE 1. Cranks 42 and 44 are mounted for independent rotation on a common shaft which forms main bearing member 4 to which reference is made above. Rotation of cranks 42 and 44 occurring about a center coinciding with the longitudinal axis of member 4 in response to input forces originating at 18 in turn causes movement of output force members 54 and 56 which may be connected to one or more control surfaces or other work members, the movements of which are sought to be controlled through system 1. Thus, member 54 could operate a rudder and member 56 could be connected to operate elevators in an airplane.

Referring again to inverted L-shaped members 38 and 40, it may be seen that the stated members, in addition to being connected by common shaft 36, are also interconnected by a force bar 58 pivotally joined to inverted L-shaped members 38 and 40 at 60 and 62, respectively. Intermediate the ends 60 and 62 of force bar 58, brackets 64 and 66 are affixed thereto whereby force may be applied to bar 58 by tension maintaining means in the form of resilient members or bungees 68 and 70 which are also connected to brackets 72 and 74, respectively. Brackets 72 and 74 are affixed to relatively stationary structure whereby reaction loads from bungees 68 and 70 may be applied to brackets 72 and 74 without causing movement of the same.

Tension maintaining means 68 and 70 may take a variety of different forms, and the inventive concept is not limited to any particular form. However, for the sake of illustration, a mechanical type bungee which might be used in system 1 is shown in FIGURE 2. Since tension maintaining means 68 and 70 may be identical, a description of either one is equally applicable to the other. Referring to FIGURE 2, it may be seen that bungee 70 includes another cylinder containing a movable piston comprising piston rod 78 and piston head 82. Piston head 82 is contained within a cup 84 which is provided with a flange 86 at one end thereof which may bear against one end of the outer cylinder forming bungee 70 as shown. A spring 88 bears at one end against flange 86 and at the other against a washer 90 engaging a shoulder 92 formed by reduced diameter portion 94 on piston rod 78. Thus it will be understood by those skilled in the art that a particular amount of force may be applied to piston rod 78 by varying the size or resilient characteristics of spring 88 whereby force may be applied to the rod in either direction of movement, the amount of such forced depending upon the amount of such movement.

*Operation*

Although the structure disclosed herein may be used for efficient transmission of applied forces over any desired distance in a variety of diverse installations and for many different purposes, its operation will not in any case differ materially from the description set forth herein for the sake of illustration. Operation of the structure involves initially establishing a desired amount of tautness in system 1 by pre-tensioning the tension members 46, 48, 50 and 52 at the time of installation and before actual use of the force transmitting system. Pretensioning of the stated members is accomplished by appropriate sizing of connecting members 46, 48, 50 and 52 as well as selection of tension maintaining means 68 and 70 whereby the dimensions and spring characteristics thereof apply the desired amount of force on bar 58 which will produce tension in members 46, 48, 50 and 52 without input or output loads or any other external loading on system 1. Thus, for example, assuming that a rig load of 200 lbs. is desired, tension maintaining means 68 and 70 are positioned or adjusted to apply force against bar 58 sufficient to result in a 200 lb. tensile force in each of members 46, 48, 50 and 52 at a time when the control surface or other work member to which elements 54 and 56 may be connected is centered and no input force is applied through members 20 and 22. In the case of a rudder controlled by system 1, for example, the stated condition of tension is established with the rudder centered or in the neutral position whereby the aerodynamic effects thereof would not tend to alter the direction of flight of a vehicle upon which such rudder may be mounted. The stated force applied by tension maintaining means 68 and 70 to force bar 58 causes tensile stress in members 46, 48, 50 and 52 by reason of the operative relationship between bar 58 and inverted L-shaped members 38 and 40 connected to the bar at either end thereof. Thus, movement of bar 58 toward the left as viewed in FIGURE 1 causes similar movement of attaching points 60 and 62, resulting in counter-clockwise movement of members 38 and 40 about a center of rotation coinciding with the longitudinal axis of main bearing member 2. Corresponding movement about the same center of rotation also occurs in respect of common shaft 36 which is also connected to members 38 and 40. Rotational movement of common shaft 36 about the axial center of member 2 causes similar movement of bellcranks 28 and 30 which are journaled on shaft 36 as described hereinabove. However, it will be understood from the structural relationship of parts as described above that rotation of the individual bellcranks 28 and 30 about the axial center of common shaft 36 does not occur during rotational movement of the entire bellcrank about the axial center of member 2. Thus, each of the arms 31 and 33 to which members 32 and 34 are respectively connected provides a moment arm substantially the same length from its axis of rotation as the moment arm provided by arms 24 and 26 with respect to their axis of rotation through member 2. Accordingly, arms 31 and 33 remain parallel at all times with arms 24 and 26 due to the kinetics of the force parallelogram defined by elements 32–24–38–31 on one side and 34–26–40–33 on the other side of system 1.

To illustrate the performance characteristics of system 1, it may be assumed that the system is installed in an aerial vehicle capable of launching at sea level atmospheric conditions such as 50–75° F. and standard pressure, and thereafter achieving sustained operating speeds whereby surface and compartment temperatures in such vehicles reach 400–500° F. due to friction and other heating effects associated with high speed operation. It is characteristic in such vehicles that temperature variations on the stated order cause dimensional changes in the vehicle structure due to the thermal growth and stress effects, and in the case of relatively large vehicles may amount to a difference of 6–12 inches or more in the overall length of the vehicle. Where a cable control system is employed to actuate control surfaces at one end of the vehicle remote from the cockpit or other location where control force signals originate, variations in the relatively rigid structure upon which location of the cable extremities depends has an understandably severe effect upon the amount of tension in such cables.

In the assumed case, it is the purpose of tension maintaining means 68 and 70 to maintain the 200 lb. rig load initially established in members 46, 48, 50 and 52 substantially constant throughout dimensional changes in vehicle structure which vary the distance separating brackets 10 and 12 from brackets 14 and 16. Thus, if aerodynamic forces or temperature changes cause structural deflections whereby brackets 14 and 16 are moved closer toward brackets 72 and 74, for example, in the view shown by FIGURE 1, the decrease of tension in members 46, 48, 50 and 52 which would otherwise result from such movement is immediately compensated by movement of piston rods 76 and 78 under the influence of the springs within bungees 68 and 70. Movement of rods 76 and 78 in the direction of arrow 80 under the illustrative conditions assumed above causes movement of force bar 58 which then moves inverted L-shaped members 38 and 40 in a counter-clockwise direction of rotation about the axial center of member 2. The stated movement of members 38 and 40 results in similar movement of bellcranks 28 and 30 which do not rotate about common shaft 36 in the stated circumstances but which move in a direction generally away from brackets 14 and 16, whereby the tension in members 46, 48, 50 and 52 is restored to substantially the same amount as the rig load which was initially established therein before the assumed deflection moved brackets 14 and 16 closer to brackets 72 and 74. It will be understood by those skilled in the art that the compensating forces applied by bungees 68 and 70 in the manner described may be continuously applied even during the application of work loads to the system.

In further connection with the manner in which tension of members 46, 48, 50 and 52 is maintained substantially constant by elements 68 and 70 as discussed above, it will be understood that movements of force bar 58 in either direction under the influence of bungees 68 and 70 to maintain such tension do not cause movement of the control surface or work member to which the output of system 1 is applied. The application of force to such member by members 54 and 56 depends entirely upon the amount and direction of force originating at input 18 and which is transmitted to the work member through system 1 along a force path which is separate and independently operable from that portion of system 1 which operates to maintain the rig load. As a result of this arrangement, it is possible to balance the entire control system in the neutral condition with any desired amount of initial rig load, and to maintain the stated condition of balance regardless of corrections in the amount of rig load applied to bar 58 by tension maintaining means 68 and 70. It will further be understood that minor variations in the amount of rig load applied to system 1 by bungees 68 and 70 may be expected to occur in the case of mechanical bungees as shown by FIGURE 2 due to the spring characteristics thereof. However, the range of such variations can be very small if the distances are small and the springs are selected with care.

As a condition of the balance characteristics mentioned above, it is helpful although not essential if member 4 is situated a vertical distance above member 2 roughly coinciding with the amount of vertical distance between member 2 and common shaft 36 regardless of the amount of lateral displacement between members 2 and 4.

Among the various modifications of structural details used to illustrate the inventive concept in the accompanying drawings which will occur to those skilled in the art, it will be obvious that members 46, 48, 50 and 52 may comprise either relatively rigid links or flexible cables, with connecting means at either extremity thereof appropriate for the type of structure involved. Moreover, tension maintaining means 68 and 70 may comprise hydraulic or pneumatic devices instead of the mechanical units shown and described herein. In addition, while system 1 has been shown and described as including two input systems to bellcranks 28 and 30, and two separate cable systems connecting the stated bellcranks to two output members 54 and 56, it is obvoius that the inventive concept disclosed herein is equally applicable to a single input member and a single pair of cables. Similarly, one tension maintaining means 68 or 70 could be employed instead of the two shown and described. Conversely, the number of input or output rods and the number of tension maintaining means could also be increased in a cable system which would embody the same inventive teachings disclosed herein.

From the description of structure set forth above, it will be understood by those skilled in the art that the maximum work load which may be applied to system 1 is limited to twice the rig load. For example, considering only that half of system 1 which comprises input members 22, 26, 34, bellcrank 30, tension members 50 and 52, crank 44 and output member 56, and further assuming equal moment arms of bellcrank 30 about the axial center of common shaft 36, it may be seen that a 10 lb. downward pull on member 34 would add 5 lbs. to the tensile load in member 50 and reduce the tensile load in member 52 by 5 lbs. If the rig load were 200 lbs., the application of 400 lbs. force in member 34 would produce 400 lbs. tension in member 50 and zero force in member 52. Thereafter, any increase of force above 400 lbs. in member 34 would not alter the forces in members 50 or 52 but would instead be applied to the resilient tension maintaining means 70 whereby its length would be decreased.

If applied work loads greater than twice the amount of rig load were desired in any given case, means may be included in system 1 to permit the application of greater work loads. The stated means may include a bracket 96 affixed to force bar 58 as shown by FIGURE 1, another bracket 98 affixed to relatively stationary structure generally near brackets 14 and 16 as shown, and an anchor member 100 connected between brackets 96 and 98. With elements 96, 98 and 100 thus arranged, it may be seen that dimensional variations affecting the tension in members 46, 48, 50 and 52 as discussed above will have a substantially identical affect upon the tension of member 100, and the compensating affect of force bar 58 under the influence of means 68 and 70 to compensate such variations in the tension of members 46, 48, 50 and 52 will also simultaneously compensate for changes in the tension of anchor member 100. It will also be understood that anchor member 100 may optionally be used to limit the movement of force bar 58 by the application of either tensile or compressive force in member 100 depending upon the direction of movement of bar 58. The effect of this restraint by member 100 on bar 58 functions to permit the application of high work loads through members 32 or 34 exceeding twice the rig load without resulting in movement of common shaft 36 or bar 58, thereby avoiding any variation in the forces or relative positions of tension maintaining means 68 and 70. Thus, in accordance with the assumed values of the illustrative case discussed above, the application of a work load in excess of 400 lbs. by member 34 will result in the entire excessive work load being applied through member 56 if anchor member 100 is incorporated in system 1, whereas without the stated anchor member, any work loads in excess of twice the 200 lb. rig load would produce only 400 lbs. in member 56 and the excess applied load would be absorbed by a change in the position of bungee 70 due to its resilient characteristics.

As a result of the teachings set forth herein, it may be seen that this invention provides an improved force transmitting system capable of transmitting input forces at one location rapidly and efficiently to a relatively remote location without any delay in transmission such as that resulting from operation of lost motion devices used to control operation of locks commonly employed in control systems known to the prior art. System 1 as disclosed in the instant case also contains no resilient links such as those involving use of locks which operate on a lost motion or any other principle. It is an inherent characteristic of system 1 disclosed herein that operation of the system in response to control input forces is, in effect, entirely separate from the application of forces applied by means 68 and 70 to compensate for changes in the rig load. Conversely, compensatory forces applied within system 1 to maintain the rig load thereof substantially constant are continuous during the application of work loads and do not affect operation of the system in response to work loads. Moreover, it is a further inherent characteristic of the inventive system disclosed herein that no inertia is added to the control system by the tension maintaining means. In addition system 1 as described herein is inherently safer than those known to the prior art in that loss of a tension maintaining means does not result in the work member being thrown uncontrollably toward one limit of movement. Thus, in the event that bungee 68 suddenly ceased to function due to an internal failure, the force applied by bungee 70 would be safely absorbed within the system and would function substantially the same both before and after such failure. Moreover, failure of a force transmitting member 46 or 48, for example, would not upset the functioning of members 50 and 52, since the latter two members will absorb all the force of bungees 68 and 70. This would result in a higher rig load than the initially preset amount, but the system can be designed with increased strength for just such an abnormal event, or anchor member 100 could be included in system 1 to absorb the extra bungee load.

While the particular structural details set forth above and in the drawings are fully capable of attaining the objects and providing the advantages herein stated, the structure thus disclosed is merely illustrative and could be varied or modified to produce the same results without departing from the scope of the inventive concept as defined in the appended claims.

I claim:

1. In a force transmitting system; a first moment arm mounted for rotation about a relatively stationary first axis in response to the application of a work load, rigid support means mounted for rotation about said first axis, a second moment arm mounted on said rigid support means for rotation about a second axis located parallel to and remotely from said first axis, rigid link means connecting the extremities of said first and second moment arms whereby rotation of said first moment arm about said first axis in response to a work load produces rotation of said second moment arm about said second axis, said link means being substantially parallel with a plane in which said first and second axes lie and said first moment arm being substantially parallel with said second moment arm thereby defining a force parallelogram, pretensioned force transmitting means operatively associated with said second moment arm for transmitting work loads to a remote location in response to the application of such loads to said first moment arm, and tension maintaining means adapted to apply force to said rigid support means tending to cause rotation thereof about said first axis to maintain the amount of said pretension substantially constant.

2. The structure set forth in claim 1 above in which said tension maintaining means applies said force to said rigid support continuously whereby the operation of said tension maintaining means is continuous throughout the application of work loads in said system.

3. The structure set forth in claim 1 above in which said tension maintaining means includes a mechanical bungee including resilient means responsive to changes in said pretension force.

4. The structure set forth in claim 1 above including in addition thereto, anchor means connected to said rigid support means to prevent movement of said rigid support means by said tension maintaining means beyond a predetermined limit of movement.

5. The structure set forth in claim 1 above in which said second moment arm comprises one of three elongate arms integrally joined to form a bellcrank, and said pretensioned force transmitting means include two elongate members, each of which is connected to the remaining said two elongate arms of said bellcrank.

6. The structure set forth in claim 1 above in which said tension maintaining means comprises a plurality of elongate members adapted to apply force to said rigid support means, said elongate members being of variable length and having one end connected to relatively stationary fixed structure and the other end connected to said rigid support means, the length of said elongate members being responsive to variations of force applied thereto.

7. The structure set forth in claim 1 above in which said first moment arm is formed by a rigid arm rotationally journaled on a relatively stationary first shaft the center longitudinal axis of which comprises said first axis, said rigid support means comprises two generally elongate members, each having one end thereof rotationally journaled on said relatively stationary shaft, said second moment arm is formed by a rigid arm rotationally journaled on a second shaft extending between said elongate members and connected thereto at the other end of each said elongate member remote from its connection with said first shaft.

8. The structure set forth in claim 1 above in which said force transmitting means comprises rigid links.

9. The structure set forth in claim 1 above in which said force transmitting means comprises flexible cables.

10. In a force transmitting system; a plurality of first moment arms mounted for rotation about a relatively stationary first axis, rigid support means mounted for rotation about said first axis, a plurality of second moment arms mounted on said rigid support means for rotation about a second axis located remotely from said first axis, rigid link means connecting the extremity of each of said first moment arms with the extremities of each of said second moment arms whereby rotation of any of said first moment arms about said first axis produces rotation of one of said second moment arms about said second axis, said link means being substantially parallel with a plane in which said first and second axes lie and said first moment arms being substantially parallel with each of said second moment arms to which said first moment arms are connected, thereby defining a force parallelogram, pretensioned force transmitting means operatively associated with said second moment arms for transmitting work loads to a remote location in response to the application of such loads to said second moment arms, and tension maintaining means adapted to apply force to said rigid support means tending to cause rotation thereof about said first axis to maintain the amount of said pretension substantially constant.

11. The structure set forth in claim 10 above in which said tension maintaining means applies said force to said rigid support continuously whereby the operation of said tension maintaining means is continuous throughout the application of work load to any of said second moment arms in said system.

12. In a force transmititng system, first bearing means for providing a relatively stationary first pivoting axis, arm means mounted on said first bearing means for rotation about said first axis, input force means for applying work loads to said arm means, movable elongate support means having one extremity thereof mounted on said first bearing means for rotational movement of said support means about said first axis, first rockable means mounted for rotation about a second pivoting axis near the other extremity of said elongate support means, connecting means operatively connected between said arm means and said first rockable means so that rotational movement of said arm means about said first axis causes corresponding rotational movement of said first rockable means about said second axis, second bearing means for providing a relatively stationary third pivoting axis remote from said first pivoting axis, second rockable means mounted for rotational movement about said third axis, elongate force transmitting means connecting said first and second rockable means whereby force applied to said first rockable means tending to rotate said first rockable means about said second axis is transmitted immediately to said second rockable means, tension maintaining means including variable force means adapted to apply force to said movable elongate support means near the extremity thereof remote from the connection of said elongate support means on said first bearing means, so that said variable force means applies force tending to rotate said elongate support means about said first axis whereby tension initially established in said elongate force transmitting means without the application of any work loads is maintained substantially constant.

13. In a force transmitting system; a first moment arm mounted for rotation about a relatively stationary first axis in response to the application of a work load, elongate support means mounted for rotation about said first axis, bellcrank means mounted on said elongate support means for rotation about a second axis located parallel to and remotely from said first axis, said bellcrank means including a second moment arm, link means connecting the extremities of said first and second moment arms whereby rotation of said first moment arm about said first axis in response to a work load produces rotation of said bellcrank means about said second axis, said link means being substantially parallel with a plane in which said first and second axes lie and said first moment arm being substantially parallel with said second moment arm thereby defining a force parallelogram, pretensioned cable means including a cable connected to said bellcrank means for transmitting work loads to a remote location in response to rotation of said bellcrank means about said second axis, and tension maintaining means adapted to apply force to said elongate support means tending to cause rotation of said elongate support means about said first axis and tending to move said second axis in a direction generally opposed to the tensile pull on said bellcrank means applied by said pretensioned cable, said force applied by said tension maintaining means to said elongate support means thereby maintaining the amount of said pretension substantially constant.

References Cited in the file of this patent

UNITED STATES PATENTS

| | | |
|---|---|---|
| 668,447 | Kreidt | Feb. 19, 1901 |
| 841,161 | Lewis | Jan. 15, 1907 |
| 1,291,642 | Elwell | Jan. 14, 1919 |
| 2,169,813 | Parkin | Aug. 15, 1939 |
| 2,549,969 | Hesemann | Apr. 24, 1951 |
| 2,908,183 | Di Giovanni | Oct. 13, 1959 |

FOREIGN PATENTS

| | | |
|---|---|---|
| 4,535 | Great Britain | Nov. 22, 1876 |
| 590,962 | Great Britain | Aug. 1, 1947 |
| 24,281 | Holland | Apr. 16, 1931 |
| 1,009,222 | France | Mar. 5, 1952 |